(12) United States Patent
Parsons

(10) Patent No.: US 6,685,158 B2
(45) Date of Patent: Feb. 3, 2004

(54) ASSEMBLY OF SOLENOID-CONTROLLED PILOT-OPERATED VALVE

(75) Inventor: Natan E. Parsons, Brookline, MA (US)

(73) Assignee: Arichell Technologies, Inc., West Newton, MA (US)

(*) Notice: Subject to any disclaimer, the term of this patent is extended or adjusted under 35 U.S.C. 154(b) by 63 days.

(21) Appl. No.: 10/011,390

(22) Filed: Dec. 4, 2001

(65) Prior Publication Data

US 2003/0102448 A1 Jun. 5, 2003

(51) Int. Cl.[7] ............................................... F16K 31/12
(52) U.S. Cl. ................................... 251/30.01; 251/61.1
(58) Field of Search .......................... 251/30.01, 30.02, 251/30.03, 30.04, 30.05, 61.1, 129.04

(56) References Cited

U.S. PATENT DOCUMENTS

| | | | | |
|---|---|---|---|---|
| 3,495,804 A | * | 2/1970 | Muller et al. ............ | 251/30.02 |
| 3,791,619 A | * | 2/1974 | Pett ........................... | 251/30.02 |
| 4,135,696 A | * | 1/1979 | Saarem et al. ........... | 251/30.02 |
| 4,206,901 A | * | 6/1980 | Williams ................... | 251/35 |
| 4,295,631 A | * | 10/1981 | Allen ....................... | 351/30.03 |
| 4,793,588 A | * | 12/1988 | Laverty, Jr. .............. | 251/30.03 |
| 4,893,645 A | * | 1/1990 | Augustinas et al. ..... | 251/30.02 |
| 4,911,401 A | * | 3/1990 | Holcomb et al. ........ | 251/30.03 |
| 5,169,118 A | * | 12/1992 | Whiteside ................ | 251/30.03 |
| 5,213,303 A | * | 5/1993 | Walker .................... | 251/30.02 |
| 5,244,179 A | * | 9/1993 | Wilson .................... | 251/30.03 |

* cited by examiner

Primary Examiner—John Bastianelli
(74) Attorney, Agent, or Firm—Foley Hoag LLP

(57) ABSTRACT

A solenoid-controlled pilot-operated valve includes an operator assembly containing a solenoid that operates a pilot valve. The pilot valve in turn controls a pressure-relief opening from a chamber whose pressure tends to hold a main valve closed until the pressure is relieved. The pilot-valve body, which forms the pilot-valve inlet, outlet, and seat is secured to the operator assembly's stationary part, and the resultant structure is only then assembled together with the main valve. This enhances positioning repeatability and thus consistency in valve timing.

11 Claims, 6 Drawing Sheets

ASSEMBLY OF SOLENOID-CONTROLLED PILOT-OPERATED VALVE

BACKGROUND OF THE INVENTION

1. Field of the Invention

The present invention is directed to manufacturing methods. In particular, it deals with ways of assembling solenoid-controlled valves of the type that are pilot-operated.

2. Background Information

Many solenoid-controlled valves are pilot-operated. They include a main valve that would require a large solenoid and a lot of power to operate directly. Rather than operate the main valve directly, the solenoid opens and closes a pilot valve that requires relatively little power to operate. But the pilot valve controls flow of fluid under pressure in such a way as to direct the fluid pressure to operate a valve that requires much greater power to operate. So it is the fluid supply that supplies the energy needed to operate the main valve, and the solenoid can be relatively small and require relatively little power.

Various piece-part tolerances and the deformation can result in some variability in the position of the pilot body. This variability can cause resultant variability in the pilot-valve member's stroke. In a low-power pilot valve even relatively small variations can affect timing or possibly sealing force adversely and even prevent the pilot valve from opening or closing at all. Although it may be possible to reduce this variability during manufacture by taking particular care, it is not typically practical to take such measures during field maintenance or replacement.

SUMMARY OF THE INVENTION

We have devised a way of eliminating this difficulty. Instead of first positioning a pilot-valve body with respect to the main valve and then so securing to the solenoid-containing operator assembly onto the main valve as to hold the pilot-valve body in place, we provide the operator assembly as a single assembly with the pilot-valve body and actuator. As will be seen below, this tends to minimize the pilot-valve-stroke variability that would otherwise afflict the system.

BRIEF DESCRIPTION OF THE DRAWINGS

The invention description below refers to the accompanying drawings, of which.

DETAILED DESCRIPTION OF AN ILLUSTRATIVE EMBODIMENT

Although the present invention can be implemented in systems of different types, the drawings will illustrate it by reference to a direct-flush system, i.e., one in which the supply pressure itself, as opposed to the gravity or otherwise-imposed pressure in a tank, is employed to flush the bowl.

Figure 1:
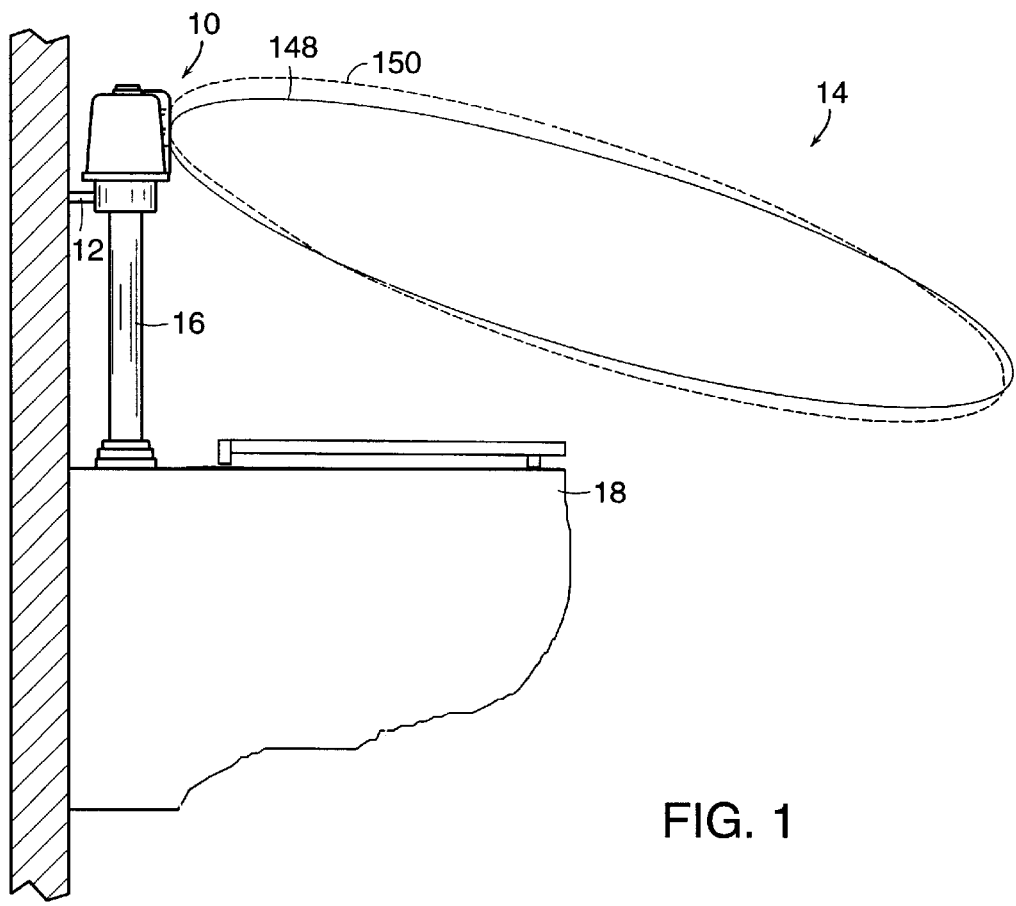
FIG. 1 is a side elevation of a toilet and an accompanying automatic flusher that employs the present invention's teachings.
Figure 2:
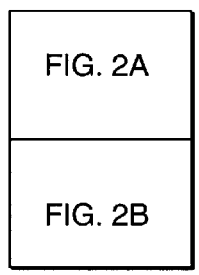
FIGS. 2A and 2B together form a cross-sectional view of the flusher illustrating the location of the flusher's control circuitry, manual-flush button, and flow path.
Figure 2A:
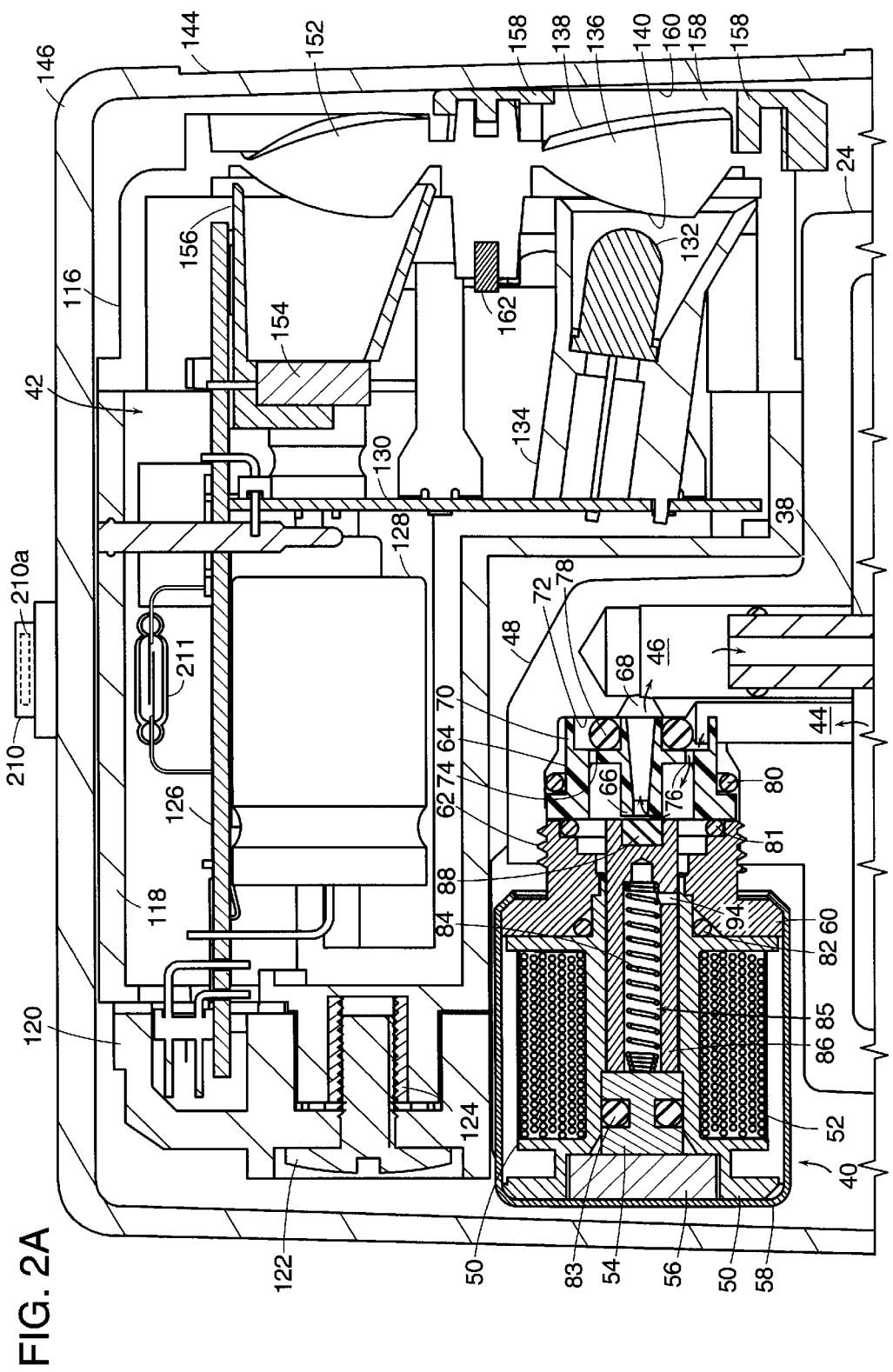
Figure 2B:
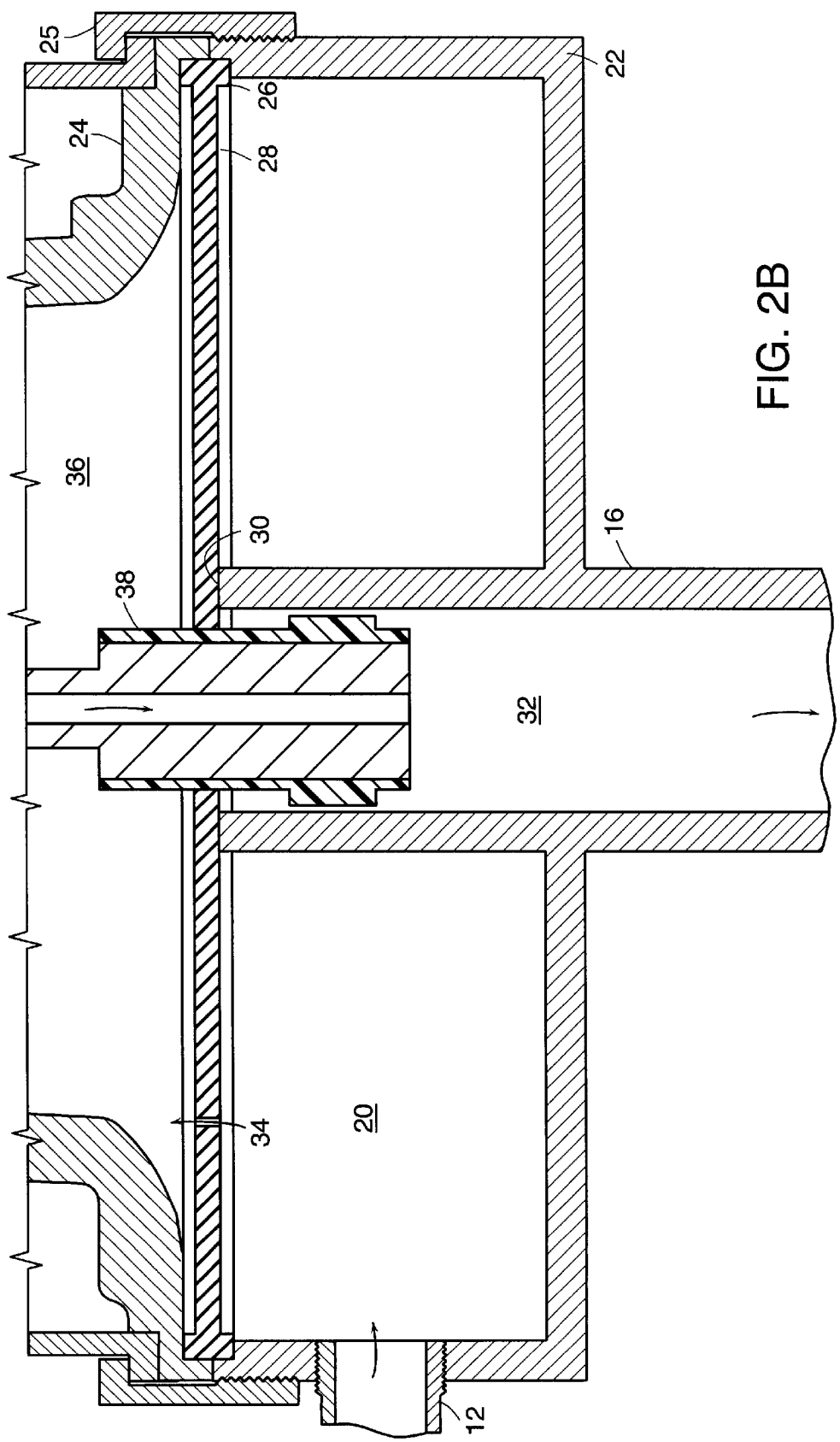

In FIG. 1, a flusher 10 receives pressurized water from a supply line 12 and employs an object sensor, typically of the infrared variety, to respond to actions of a target within a target region 14 by selectively opening a valve that permits water from the supply line 12 to flow through a flush conduit 16 to the bowl of a toilet 18. FIGS. 2A and 2B show that the supply line 12 communicates with an annular entrance chamber 20 defined by an entrance-chamber wall 22 formed near the flush conduit 16's upper end. A pressure cap 24 secured by a retaining ring 25 to the chamber housing clamps between itself and that housing the outer edge 26 of a flexible diaphragm 28 seated on a main valve seat 30 formed by the flush conduit 16's mouth.

The supply pressure that prevails in the entrance chamber 20 tends to unseat the flexible diaphragm 28 and thereby cause it to allow water from the supply line 12 to flow through the entrance chamber 20 into the flush conduit 16's interior 32. But the diaphragm 28 ordinarily remains seated because of pressure equalization that a bleed hole 34 formed by the diaphragm 28 tends to permit between the entrance chamber 20 and a main pressure chamber 36 formed by the pressure cap 24. Specifically, the pressure that thereby prevails in that upper chamber 36 exerts greater force on the diaphragm 28 than the same pressure within entrance chamber 20 does, because the entrance chamber 20's pressure prevails only outside the flush conduit 16, whereas the pressure in the main pressure chamber 36 prevails everywhere outside of a through-diaphragm feed tube 38. To flush the toilet 18, a solenoid-operated actuator assembly 40 controlled by circuitry 42 relieves the pressure in the main pressure chamber 38 by permitting fluid flow, in a manner to be described in more detail below, between pilot entrance and exit passages 44 and 46 formed by the pressure cap 24's pilot-housing portion 48.

Figure 3:
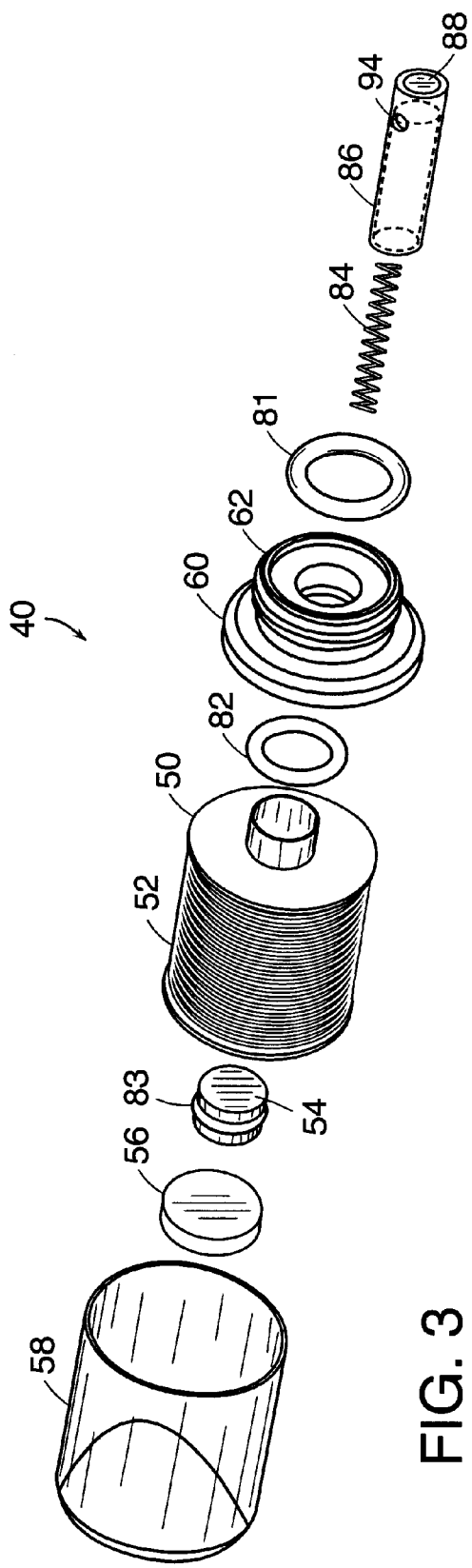
FIG. 3 is an exploded view of a latching version of the pilot-valve operator shown in FIG. 2A.
Figure 4:
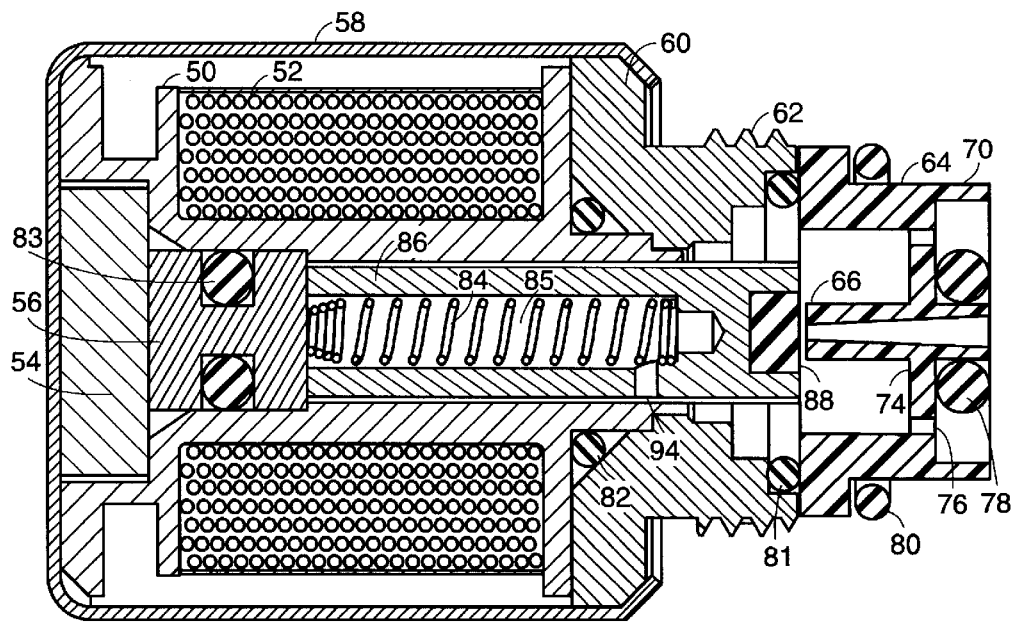
FIG. 4 is a more-detailed cross-sectional view of that operator.

The pilot-valve-operator assembly 40, of which FIG. 3 is an exploded view and FIG. 4 is a more-detailed cross-section, includes a bobbin 50 about which windings 52 are wound. A ferromagnetic pole piece 54 and, in latching versions of the operator, a permanent magnet 56 are disposed in recesses that the bobbin 50 forms at its left end. A solenoid can 58 is crimped at its right end to hold a right pole piece 60 against the bobbin 50 and thereby secure within the can 58 the bobbin 50, windings 52, left pole piece 54, and magnet 56. As FIG. 2 shows, the right pole piece 60 forms exterior threads 62 that engage complementary threads formed by the pilot housing 48, and the operator assembly 40 is thereby mounted on the pressure cap 24.

This mounting of the pilot-valve-actuator assembly 40 also secures within the pilot housing 48 a pilot body member 64. That member forms a central tube 66 by which, when the operator permits it, water from the pilot entrance passageway 44 can flow through a pilot opening 68 to the pilot exit passage 46 and from there through the through-diaphragm feed tube 38 to the flush passage 32, as was previously mentioned. The pilot body member 64 forms legs 70 that space from a pilot-housing-recess wall 72 a pilot-body-member wall 74 that forms openings 76 by which the water in the pilot entrance passageway reaches the central tube 66's entrance. An O-ring 78 seals between the central tube 66 and the recess wall 72 to prevent water from flowing from the pilot entrance passageway 44 into the pilot-body outlet opening 68 without having first flowed through the pilot body member's central tube 66. Another O-ring 80 is provided to prevent flow around the pilot body, while a further O-ring 81 seals between the pilot body member 64 and the right pole piece 60, and yet another O-ring 82 seals between the right pole piece and the bobbin. Finally, a further O-ring 83 prevents liquid in the bobbin 50's central void from escaping around pole piece 54.

An actuator spring 84 disposed in the control bore 85 of a ferromagnetic actuator 86 so acts between the left pole piece 54 and the actuator 86 as to tend to keep a resilient valve member 88 seated on a valve seat that the central tube 66's left end forms. With member 88 thus seated, water cannot flow from the pilot entrance passage 44 to the pilot exit passage 46. So the pressure in the main-valve pressure chamber 36 cannot exhaust through the pilot body member's central tube 66, and it therefore keeps the main valve closed by causing diaphragm 28 to bear against its seat 30.

To flush the toilet 18, the control circuit 42 drives current through the solenoid windings 52 and thereby generates a magnetic field that tends to concentrate in a flux path including the ferromagnetic actuator 86, the pole pieces 54 and 60, and the solenoid can 58. (The can may be made of, say, 400-series stainless steel, whose magnetic permeability is relatively high for stainless steel.) The resultant magnetic force on the actuator 86 moves it to the left in FIG. 2 against the spring force and thereby lifts the pilot-valve member 88 from its seat. This permits flow through the pilot-valve body member's central tube 66 to relieve the main pressure chamber 36's pressure and thereby allow supply pressure in the entrance chamber to open the main valve, i.e., to lift diaphragm 28 off its seat 30.

In the embodiment illustrated in FIGS. 2, 3, and 4, the operator assembly includes a magnet 56, and the actuator's leftward movement places the actuator in a position in which the force from the magnet's field is great enough to overcome spring 84's force and thereby retain the pilot valve in the open state even after current no longer flows in the solenoid's windings 52. That is, the operator is of the latching variety. In non-latching versions, there is no such permanent magnet, so current must continue to flow if the pilot valve is to remain open, and the pilot valve can be closed again by simply removing the current drive. To close the pilot valve in the illustrated, latching-valve version, on the other hand, current must be driven through the windings in the reverse direction: it must be so driven that the resultant magnetic field counters the permanent-magnet field that the actuator experiences. This allows the spring 84 to re-seat the actuator 86 in a position in which the spring force is again greater than the magnetic force, and the actuator will remain in the pilot-valve-closed position when current drive is thereafter removed.

Note that the actuator's central void 85 communicates through a flow passage 94 with the space to the right of the actuator. Water can flow into the bobbin recess that contains the actuator, and, in the absence of that flow passage, the water's presence might present more viscous resistance to actuator motion than is desirable. The actuator flow passage's communication with the internal void 85 provides a low-flow-resistance path for the water to move back and forth in response to the actuator 86's motion.

Now, when the pilot-operated valve of FIGS. 2, 3, and 4 is assembled, the pilot-valve body is first inserted into the cavity that the main valve body forms for it, and it is thereafter secured in place by the actuator assembly's being screwed into place. This ordinarily is a hand operation, and it is subject to some difficulty because the pilot-valve body is loose and can fall out while the human assembler is reaching for the operator assembly. The present invention eliminates this problem, as will now be explained with respect to FIGS. 5 and 6.

Figure 5:
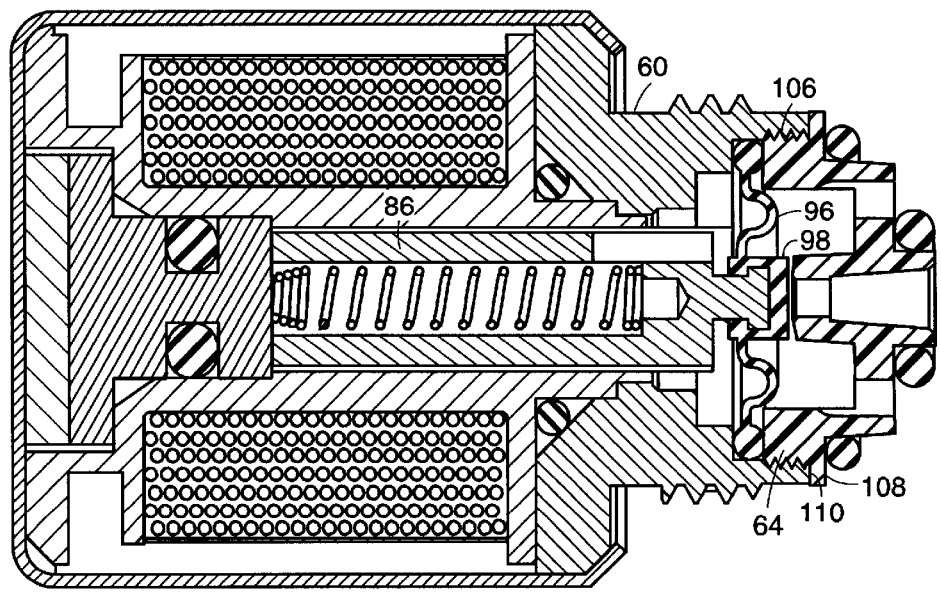
FIG. 5 is a cross-sectional view of another alternative version of the operator.

Many of FIG. 5's elements are essentially the same as those of FIG. 4, and corresponding parts are numbered identically. A minor difference is that FIG. 5 replaces FIG. 4's O-ring 82 with an isolation diaphragm 96, which extends completely across the pole-piece opening to seal the actuator from exposure to the liquid that the valve controls. This is different from the arrangement of FIGS. 2, 3, and 4, where the actuator 86 comes into contact with the fluid (typically water) being controlled. If that liquid is corrosive, the actuator 86 in the arrangement of FIGS. 2, 3, and 4 is best made from a material that tends to resist corrosion. But a corrosion-resistance requirement tends to eliminate from consideration some of the more magnetically permeable materials. This is unfortunate, because the use of lower-magnetic-permeability materials can exact a cost: it increases the solenoid-current requirement and, possibly, the winding-conductor thickness. By isolating the actuator 86 from the fluid, the arrangement of FIGS. 5 and 6 reduces the need for the actuator to be made of corrosion-resistant materials; it can be made of materials whose magnetic permeabilities are relatively high.

Figure 6:
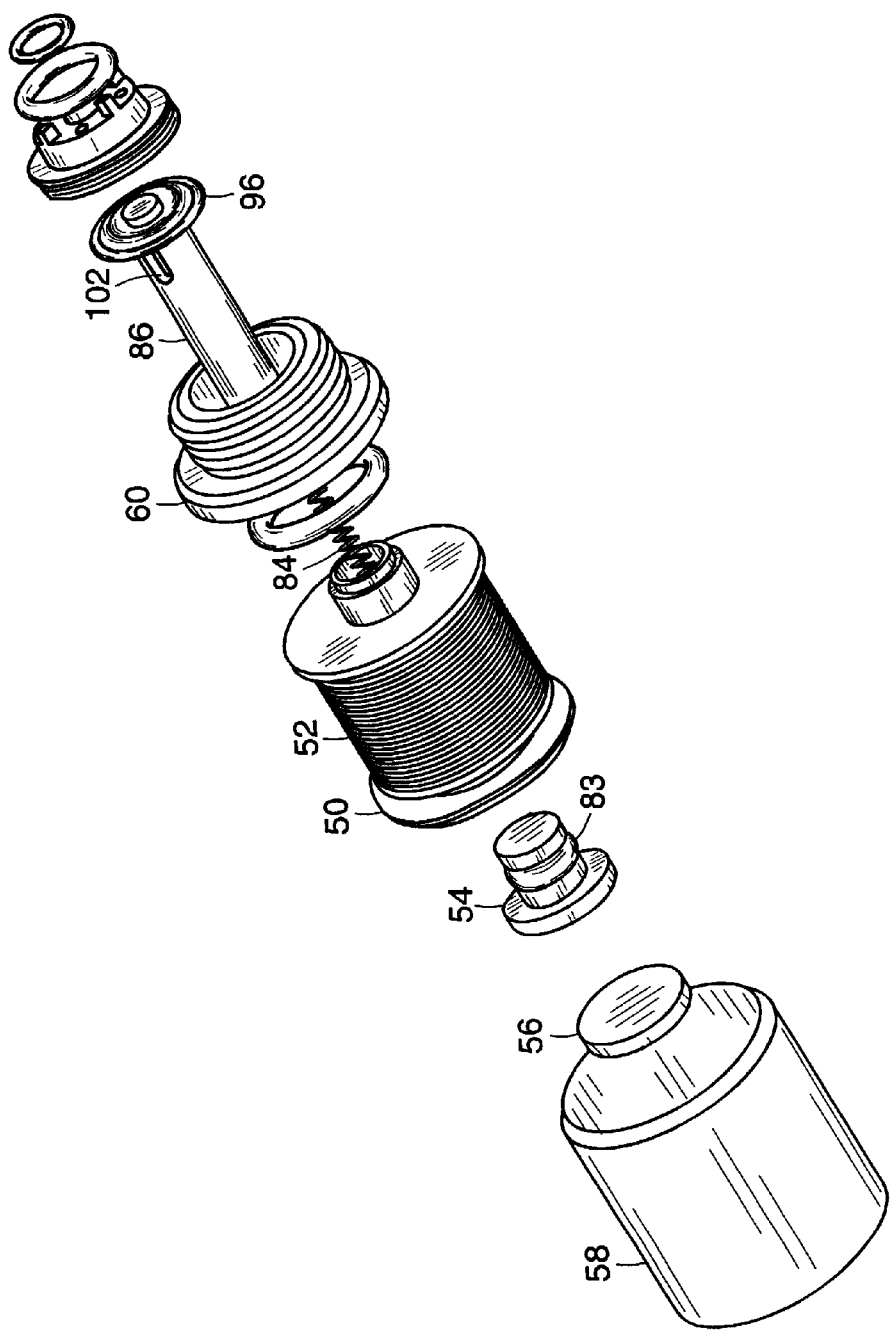
FIG. 6 is an exploded view of the operator of FIG. 5.

In the arrangement that FIGS. 5 and 6 illustrate, FIG. 4's resilient valve member 88 is replaced with a thickened region 98 in a C-shaped portion of the diaphragm 96. That diaphragm portion is snap fit onto an actuator head portion 100 provided for that purpose. The FIG. 5 arrangement provides a slot 102 in the actuator 86 to provide a low-flow-resistance flow path similar to FIG. 4's radially extending passage 94. The FIG. 5 arrangement needs a flow path despite being sealed from the liquid being controlled because, in order to balance the pressure that the controlled liquid exerts on the diaphragm 96's outer face, some other liquid is provided in a reservoir 104 defined by the diaphragm 96 and extending into the actuator 86's central void 85. This fluid must flow through that void as the actuator moves, and the slot 102 provides a low-resistance path for this to occur. The reservoir liquid should be of a type that is less corrosive than the fluid being controlled. The reservoir liquid can simply be water, in which case it would typically be distilled water or water that otherwise contains relatively few corrosive contaminants. Alcohol is another choice. The choice of reservoir is not critical, but most users will find it preferable for the liquid to be non-toxic and relatively inviscid.

Although the use of such isolation has the advantage just explained, the present invention can be practiced in non-isolated versions, too. What is important in the context of the present invention is that the pilot body member 64 is assembled onto the main valve assembly as part of a pilot-valve assembly in which it is already secured to the operator assembly. To this end, the illustrated embodiment's body member 64 is provided by way of example with threads 106 that engage complementary threads provided by the right pole piece 60. In the particular embodiment that FIG. 5 illustrates, the pilot body member forms a flange 108. That flange so butts against a shoulder portion 110 of the right pole piece 60 as to act as a positive stop to the pilot body member's being screwed onto the operator.

This makes the pilot-valve member 98's open-state positioning with respect to the central tube 66's valve seat—and thus the pilot-valve stroke—quite repeatable, as can be appreciated best by contrasting the version of FIG. 5 with that of FIG. 4. In FIG. 4, the body member 64 is secured in place as a result of the operator's being screwed into position in the pilot housing. This makes the pilot-valve stroke sensitive to various piece-part tolerances and deformations, as can be appreciated by considering FIG. 2A. Tolerances in the size of the pilot-valve body member 64 together, together with variations in the deformations of O-rings 78 and 81, all affect the position of the pilot body's central tube 66 with respect to the resilient valve member 88.

This variability is undesirable. In a typical low-power pilot valve of the type that may be employed for flusher use, for example, a deviation of as little as 0.004 inch from nominal in open-state spacing can result in the pilot valve's failing to open or close. Excessive power use or insufficient sealing pressure can result from deviations even smaller. Although taking particular care during manufacture may make it possible to keep such variations within acceptable limits, it typically is not practical to take such measures during field maintenance or replacement.

In the arrangement of FIG. 5, on the other hand, the pilot-valve/seat spacing is set when the pilot body member is assembled onto the operator, and it is independent of the piece-part variations mentioned above. So the present invention constitutes a significant advance in the art.

What is claimed is:

1. For assembling a pilot-valve-operated automatic flow controller, a method comprising:
    A) providing a main valve assembly that includes:
       i) a main valve body member that forms a main-valve inlet, a main-valve seat, a main-valve outlet, a pressure chamber, and a pressure-relief outlet through which the pressure in the pressure chamber can be relieved; and
       ii) a main valve member movable between a closed position, in which it seals against the main-valve seat and thereby prevents flow from the main inlet to the main outlet, and an open position, in which it permits such flow, the main valve member being so exposed to the pressure chamber that the contents tend when they are pressurized to urge the main valve member to its closed position and when their pressure is relieved to permit the main valve member to assume its open position;
    B) providing a pilot-valve assembly that includes:
       i) a pilot body member that forms threads thereon, a pilot-valve inlet, a pilot-valve seat, and a pilot-valve outlet; and
       ii) an operator assembly including:
          a) a stationary operator-assembly portion that forms threads thereon that are complementary to and so engage the threads formed on the pilot body member as to secure the pilot body member to the stationary operator-assembly portion as to keep the pilot-valve seat in a fixed position with respect to the stationary operator-assembly portion, the stationary operator-assembly portion including a solenoid; and
          b) a movable operator-assembly portion driveable by the solenoid between an extended position, in which it seals against the pilot-valve seat and thereby prevents flow from the pilot inlet to the pilot outlet, and retracted position, determined by the location of the stationary operator-assembly portion, in which it is spaced from the pilot-valve seat by a spacing determined by the position of the pilot-valve seat with respect to the stationary operator-assembly portion and thereby permits such flow; and
    C) so securing the pilot-valve assembly to the main valve assembly that fluid flowing from the pressure-relief outlet must flow through the pilot-valve inlet, past the pilot-valve seat, and through the pilot-valve outlet, whereby the pilot-valve assembly is positioned to control relief of the pressure in the pressure chamber.

2. A method as defined in claim 1 wherein the main valve member is a deformable diaphragm.

3. A method as defined in claim 1 wherein the pilot-valve assembly includes a diaphragm that isolates the actuator from fluid that flows from the pilot-valve inlet to the pilot-valve outlet.

4. A method as defined in claim 1 wherein the step of providing the pilot-valve assembly includes providing the pilot body member as a part separate from the operator assembly and then securing the pilot body member to the operator assembly before securing the pilot-valve assembly to the main valve assembly.

5. A method as defined in claim 4 wherein the pilot-valve assembly includes a diaphragm that isolates the actuator from fluid that flows from the pilot-valve inlet to the pilot-valve outlet.

6. A method as defined in claim 4 wherein the main valve member is a deformable diaphragm.

7. A method as defined in claim 1 wherein
    A) the pilot body member provides a stop surface that so butts against the operator assembly as to prevent the pilot body member from threadedly advancing beyond a stop position; and
    B) the step of securing the pilot body member to the operator assembly includes threadedly advancing the pilot body member on the operator assembly until the stop member stops it at the stop position.

8. A method as defined in claim 1 wherein the movable operator-assembly portion includes an actuator and a pilot-valve member secured to the actuator.

9. A method as defined in claim 8 wherein the actuator consists essentially of ferromagnetic material.

10. A method as defined in claim 9 wherein the pilot-valve member consists essentially of resilient material.

11. A method as defined in claim 8 wherein the pilot-valve member consists essentially of resilient material.

* * * * *